United States Patent
Bierwisch et al.

(10) Patent No.: US 7,079,074 B2
(45) Date of Patent: Jul. 18, 2006

(54) RECEIVER FOR RECEIVING SATELLITE-BASED NAVIGATION SIGNALS, AND NAVIGATION SYSTEM

(75) Inventors: Bernd Bierwisch, Aachen (DE); Peter Skaliks, Wuerselen (DE); Peter Scheufen, Hamburg (DE); Andreas Guth, Duesseldorf (DE)

(73) Assignee: Global Navigation Systems GNS GmbH, Wuerselen (DE)

( * ) Notice: Subject to any disclaimer, the term of this patent is extended or adjusted under 35 U.S.C. 154(b) by 0 days.

(21) Appl. No.: 11/038,177

(22) Filed: Jan. 21, 2005

(65) Prior Publication Data

US 2005/0206561 A1 Sep. 22, 2005

(30) Foreign Application Priority Data

Jan. 24, 2004 (DE) .................. 20 2004 001 092 U
Mar. 17, 2004 (DE) ...................... 10 2004 013 377

(51) Int. Cl.
H04B 7/185 (2006.01)
(52) U.S. Cl. ............................... 342/357.06
(58) Field of Classification Search ........... 342/357.01, 342/357.06, 357.12, 357.13; 701/207, 213, 701/215
See application file for complete search history.

(56) References Cited

U.S. PATENT DOCUMENTS 6,007,372 A * 12/1999 Wood .......................... 439/502

* cited by examiner

Primary Examiner—Dao Phan
(74) Attorney, Agent, or Firm—Diller, Ramik & Wight

(57) ABSTRACT

In a receiver (1) for receiving satellite-based navigation signals, comprising a receiving unit (3), a computer unit (9) connected with the receiving unit (3) for processing and forwarding signals and data for navigation purposes, and an interface (7) for connecting the receiver (1) with a navigation computer, it is provided that at least one interface (2) for insertion of plug-in modules (4,5,6) with different functions is connected to the computer unit (9).

13 Claims, 1 Drawing Sheet

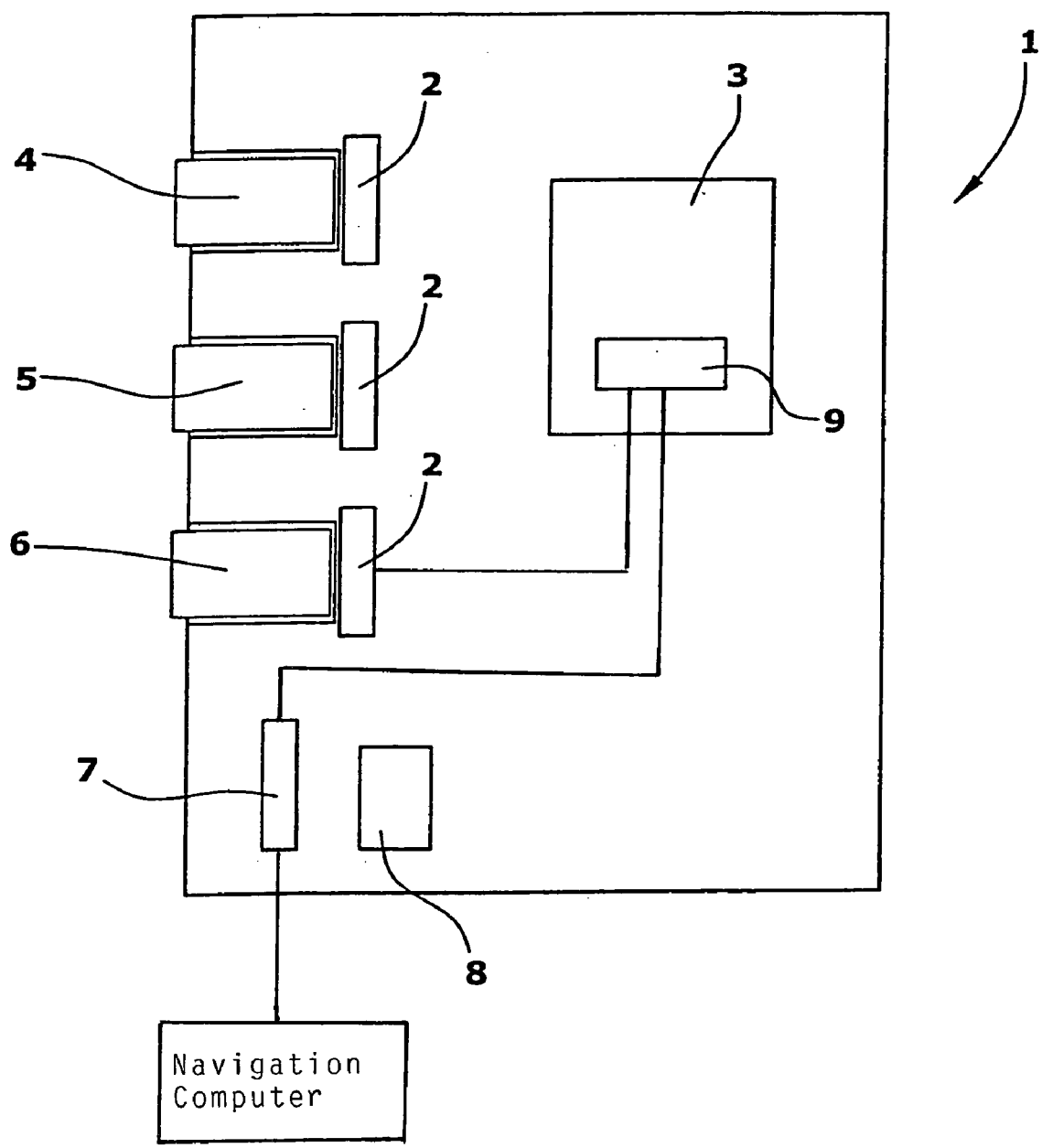

RECEIVER FOR RECEIVING SATELLITE-BASED NAVIGATION SIGNALS, AND NAVIGATION SYSTEM

BACKGROUND OF THE INVENTION

1. Field of the Invention

The invention relates to a receiver for receiving satellite-based navigation signals, and a navigation system.

2. Description of Related Art

Receivers for receiving satellite-based navigation signals have been known for quite some time. Such receivers comprise a receiving unit for receiving navigation signals emitted by satellites, wherein said receiving unit is connected with a computer unit for processing and forwarding said signals and data for navigation purposes. The receiver is connectable via an interface with a navigation computer, for example a portable, in particular a handheld, computer.

It is further known that the receiving unit receives, besides satellite-based navigation signals, also digital traffic information.

It is a drawback of this type of receivers that for using an alternative or new technology, for example for connecting the receiver with the navigation computer, always a new receiver must be connected. Further, the connecting plugs for the navigation computers are not standardized such that a user must always also buy a new receiver when purchasing a new navigation computer.

SUMMARY OF THE INVENTION

It is thus an object of the present invention to advance a receiver of the type described above in such a way that an adaptation to new tasks or functions of the receiver can be carried out in a simple manner.

The interface for insertion of plug-in modules for different functions allows the receiver to be retrofitted in a simple manner and to be adapted to a new task or a desired function or to different navigation computers. The use of plug-in modules allows the extended functions to be completely integrated into the receiver such that said receiver is not increased in size. Thus, it is possible to individually configure a navigation system which comprises the navigation computer and the receiver.

In a preferred embodiment, it is provided that a plug-in module is a radio communication transceiver unit, preferably configured for wireless connection with the navigation computer. This allows later establishment or retrofitting of a wireless connection, for example a Bluetooth connection, with the navigation computer. It is however further possible to connect a mobile radio communication transceiver unit as a plug-in module with the receiver such that a radio contact via the receiver with a transceiver outside the navigation system is possible, for example for sending an emergency call or using value-added network services.

Connection of the receiver with the navigation computer can generally be realized via a releasable cable connection. Said releasable cable connection allows the navigation computer to be first connected with the receiver via the cable connection, and a wireless connection, as described above, instead of the cable connection, to be provided later or alternatively between receiver and navigation computer.

In another embodiment, it is provided that a plug-in module is a traffic-information receiver. If, for example, the navigation software on the navigation computer is not designed for processing digital traffic information, the user can first employ the navigation computer and the receiver without a traffic-information receiver. During an update of the software, a traffic-information receiver can be retrofitted without an exchange of the receiver. Such a traffic-information receiver allows the navigation to be dynamically adapted to current traffic conditions.

According to an advantageous aspect of the present invention, it is provided that a plug-in module is a self-sustaining power-supply unit, preferably a battery. This allows the receiver to operate independently of a power-supply cable, and permits simple exchange of the power-supply unit in the case of long-term use. It is further possible to first do without an additional power-supply unit when a cable connection is used, and to retrofit a power-supply unit in a simple manner when a wireless operation is desired later.

It may be provided that the plug-in module comprises a sound converter, preferably for speech reproduction. In this manner, it is possible to allow, alternatively or additionally to the speech reproduction of the navigation computer, also a speech reproduction of the receiver. It is further possible to configure the sound converter as a microphone such that speech control of the navigation system via the receiver is feasible.

In a further embodiment, it is provided that a plug-in module comprises a display. Thus, a display can be retrofitted to the receiver, which display may be used either alternatively to a display of the navigation computer or generally serve as the display of the navigation computer. In this embodiment, the display may be provided as a lateral attachment part of the receiver.

According to a further aspect, it is provided that the interfaces are universal interfaces. This ensures that the number of interfaces may be smaller than the number of all plug-in modules offered. Further, the user may vary the plug-in modules in a user-defined manner and thus configure the receiver according to his requirements.

In the case of similar universal interfaces, the plug-in modules can be inserted into each interface. However, the interfaces need not be of similar configuration for different plug-in modules, and may comprise different receiving sockets.

BRIEF DESCRIPTION OF THE DRAWING

Hereunder the invention is described in detail with reference to the drawing in which:

The only FIGURE shows a diagram of the setup of a receiver according to the present invention.

DETAILED DESCRIPTION OF THE PREFERRED EMBODIMENT OF THE INVENTION

In the FIGURE, a receiver 1 for receiving satellite-based navigation signals is shown. In the receiver 1 a receiving unit 3 is integrated which receives the navigation signals emitted by the navigation satellites, for example the satellites of the GPS system. The receiving unit 3 has connected therewith a computer unit 9. The navigation signals received by the receiving unit 3 are forwarded to the computer unit 9 for processing purposes. Via an interface 7 the receiver 1 can be connected with a navigation computer which is not shown. The computer unit 9 forwards the received satellite signals via the interface 7 to the navigation computer. For the sake of clarity, the connection between the computer unit 9 and all interfaces is not shown. The receiver 1 further comprises interfaces 2 for the insertion of plug-in modules

4,5,6 to which plug-in modules 4,5,6 with different functions can be connected. Thus, the plug-in modules 4,5,6 may either be fully integrated in the receiver housing or partly project from the receiver. The plug-in modules 4,5,6 may, for example, comprise a radio communication transceiver unit via which the receiver 1 is connectable with the navigation computer through a wireless connection instead of being connected through a cable connection via the interface 7. In this embodiment, signals and data for navigation purposes are forwarded to the navigation computer from the computer unit 9 via an interface 2 and the plug-in module 4 using radio receivers of the receiver unit.

Additionally or alternatively, the radio communication transceiver unit may be a mobile radio unit, for example of GPRS or UMTS standard, by means of which the navigation system is also connectable to the outside, for example for sending emergency calls with exact position information or for using so-called value-added network services, such as up-to-date weather services, events services or the like.

Additionally or alternatively, a plug-in module 4,5,6 may comprise a traffic-information receiver. Said traffic-information receiver receives digital traffic-information data, for example via a Traffic Message Channel (TMC), and forwards said data via the interface 2 to the computer unit 9. The computer unit 9 processes this data and transfers it through an interface 2 via radio or through the interface 7 via a cable to the navigation computer. Thus, up-to-date traffic data can be taken into account in the navigation computation carried out in the navigation computer for the purpose of dynamic route computation.

It is further possible that the plug-in module 4,5,6 comprises a self-sustaining power-supply unit, such as a battery. This allows, in the case of wireless use of the receiver 1, a power-supply cable to be omitted. It is further possible to rapidly exchange the power-supply unit in the form of a battery or an accumulator. An additional external power supply, for example via a cable to a connector 8, can additionally or alternatively supply the receiver 1 with the required power. It is also possible to charge a plug-in module 4,5,6 from the power-supply unit via this connector 8. Thus, a reliable energy supply of the receiver 1 is guaranteed.

Further, it is possible that a plug-in module comprises, for example, a sound converter which may be configured as a simple speaker and/or a microphone. The navigation instructions of the navigation computer may be emitted via said speaker. If the sound converter is configured as a microphone, speech control of the navigation system may be effected via said microphone.

The plug-in module 4,5,6 may comprise a display via which the navigation instructions are issued. Such a display can be used additionally or alternatively to the display of the navigation computer. Thus, computers without a display or with a very small display may be used as a navigation computer since in this case the plug-in module 4,5,6 provided with a display indicates the navigation instructions or information.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

What is claimed is:

1. A receiver (1) for receiving satellite-based navigation signals comprising a receiving unit (3) including a computer unit (9) for receiving, processing and forwarding signals and data for navigation purposes, said receiving unit (3) including a first interface (7) for receiving signals and data from said computer unit (9) and for connecting with a navigation computer, said receiving unit (3) further including at least one other interface (2) having a plug-in receptor for receipt of at least one of a plurality of plug-in modules (4, 5, 6) having different functions, and said at least one other interface (2) being connected to said computer unit (9).

2. The receiver as defined in claim 1 including at least one plug-in module (4, 5 or 6) plugged in said plug-in receptor, and said at least one plug-in module (4, 5 or 6) is a radio communication transceiver unit adapted for wireless communication/connection with a navigation computer.

3. The receiver as defined in claim 1 wherein said first interface (7) has releasably connected thereto a cable connection adapted for connection to a navigation computer.

4. The receiver as defined in claim 1 including at least one plug-in module (4, 5 or 6) plugged in said plug-in receptor, and said at least one plug-in module (4, 5 or 6) is a traffic-information receiver.

5. The receiver as defined in claim 1 including at least one plug-in module (4, 5 or 6) plugged in said plug-in receptor, and said at least one plug-in module (4, 5 or 6) includes a self-sustaining battery power-supply unit.

6. The receiver as defined in claim 1 including means (8) for connecting the receiver to an external power-supply.

7. The receiver as defined in claim 1 including at least one plug-in module (4, 5 or 6) plugged in said plug-in receptor, and said at least one plug-in module (4, 5 or 6) is a speech reproduction sound converter.

8. The receiver as defined in claim 1 including at least one plug-in module (4, 5 or 6) plugged in said plug-in receptor, and said at least one plug-in module (4, 5 or 6) is a visual display.

9. The receiver as described in claim 1 wherein said at least one other interface (2) is a universal interface.

10. The receiver as defined in claim 2 including means for transmitting signals and data from said computer unit (9) to said at least one other interface (2).

11. The receiver as defined in claim 2 wherein signals and data are hard wire transmitted from said computer unit (9) to said first interface (7) and to said at least one other interface (2).

12. The receiver as defined in claim 10 wherein said first interface (7) has releasably connected thereto a cable connection adapted for connection to a navigation computer.

13. The receiver as defined in claim 11 wherein said first interface (7) has releasably connected thereto a cable connection adapted for connection to a navigation computer.

* * * * *